(12) United States Patent
Tamura et al.

(10) Patent No.: US 12,437,072 B2
(45) Date of Patent: Oct. 7, 2025

(54) MONITORING SYSTEM

(71) Applicant: Panasonic Intellectual Property Management Co., Ltd., Osaka (JP)

(72) Inventors: Kento Tamura, Osaka (JP); Jun Anzai, Kanagawa (JP); Toshihisa Nakano, Osaka (JP); Yoshiharu Imamoto, Kanagawa (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 149 days.

(21) Appl. No.: 18/236,031

(22) Filed: Aug. 21, 2023

(65) Prior Publication Data

US 2023/0394149 A1 Dec. 7, 2023

Related U.S. Application Data

(63) Continuation of application No. PCT/JP2021/042361, filed on Nov. 18, 2021.

(30) Foreign Application Priority Data

Mar. 1, 2021 (JP) ................. 2021-031994

(51) Int. Cl.
  *G06F 21/56* (2013.01)
  *G06F 9/455* (2018.01)
(52) U.S. Cl.
  CPC ........ *G06F 21/566* (2013.01); *G06F 9/45558* (2013.01); *G06F 2009/45591* (2013.01); *G06F 2221/034* (2013.01)
(58) Field of Classification Search
  CPC ............... G06F 21/566; G06F 9/45558; G06F 2009/45591

USPC .......................................... 726/23
See application file for complete search history.

(56) References Cited

U.S. PATENT DOCUMENTS

| 2013/0133068 A1* | 5/2013 | Jiang ................... H04L 63/1458 726/23 |
| 2021/0019170 A1 | 1/2021 | Sugano |

FOREIGN PATENT DOCUMENTS

| JP | 6079218 | | 2/2017 |
| JP | 2018160020 A | * | 10/2018 |
| JP | 2019-144785 | | 8/2019 |
| JP | 2019144785 A | * | 8/2019 |
| JP | 2019-185130 | | 10/2019 |

OTHER PUBLICATIONS

International Search Report (ISR) from International Searching Authority (Japan Patent Office) in International Pat. Appl. No. PCT/JP2021/042361, dated Feb. 1, 2022, together with an English language translation.
Office Action from Japan Patent Office (JPO) in Japanese Patent Appl. No. 2023-503377, dated May 7, 2025, together with an English language translation.

* cited by examiner

*Primary Examiner* — Zi Ye
(74) *Attorney, Agent, or Firm* — Greenblum and Bernstein, P.L.C.

(57) ABSTRACT

The monitoring system is a system that monitors a virtualization system, the system including: a VM monitor and a request monitor each of which has a different authority, monitors the virtualization system, and detects an anomaly; and a determiner that determines a state of the virtualization system based on monitoring results from the VM monitor and the request monitor.

20 Claims, 10 Drawing Sheets

FIG. 2A

Monitoring result log

| Time of day | Monitor | Monitoring result |
|---|---|---|
| 2020/12/16 13:01:03 | VM monitor | Normal |
| 2020/12/16 13:01:10 | Request monitor | Anomalous |
| 2020/12/16 13:01:13 | VM monitor | Anomalous |
| 2020/12/16 13:01:15 | Request monitor | Anomalous |
| ... | | |

FIG. 2B

Response determination list

| VM monitor | Request monitor | Response |
|---|---|---|
| Normal | Normal | Nothing especially |
| Anomalous | Normal | Stop VM, enhance monitoring of request monitor |
| Normal | Anomalous | Cut off inter-VM communication, enhance monitoring of VM monitor |
| Anomalous | Anomalous | Reboot VM |
| ... | ... | ... |

FIG. 7A

Monitoring result log

| Time of day | Monitor | Monitoring result |
|---|---|---|
| 2020/12/16 13:01:03 | VM monitor | Normal |
| 2020/12/16 13:01:10 | Request monitor | Anomalous |
| 2020/12/16 13:01:13 | VM monitor | Anomalous |
| 2020/12/16 13:01:15 | Request monitor | Anomalous |
| 2020/12/16 13:01:20 | HV monitor | Normal |
| ... | | |

FIG. 7B

Response determination list

| VM monitor | Request monitor | HV monitor | Response |
|---|---|---|---|
| Normal | Normal | Normal | Nothing especially |
| Anomalous | Normal | Normal | Stop VM, enhance monitoring of request monitor |
| Normal | Anomalous | Normal | Cut off inter-VM communication, enhance monitoring of VM monitor |
| Normal | Normal | Anomalous | Reboot system |
| Anomalous | Anomalous | Normal | Reboot VM |
| ... | ... | ... | ... |

FIG. 10

| First | Second | Third | Determination | Response |
|---|---|---|---|---|
| VM monitor | Request monitor | | After anomaly occurred in VM_A, there is a possibility that it is being deployed outside of VM_A | Reboot VM_A |
| Request monitor | VM monitor | | After anomaly occurred in VM_B, there is a possibility that it has been deployed to VM_A | Reboot VM_A and VM_B |
| VM monitor | Request monitor | HV monitor | After anomaly occurred in VM_A, there is a possibility that it has been deployed to HV | Reboot HV, enhance monitoring of VM monitor |
| Request monitor | HV monitor | VM monitor | After anomaly occurred in VM_B, there is a possibility that it has been deployed to HV and VM_A | Reboot HV, enhance monitoring of request monitor |
| ... | ... | ... | ... | ... |

MONITORING SYSTEM

CROSS REFERENCE TO RELATED APPLICATIONS

This is a continuation application of PCT International Application No. PCT/JP2021/042361 filed on Nov. 18, 2021, designating the United States of America, which is based on and claims priority of Japanese Patent Application No. 2021-031994 filed on Mar. 1, 2021. The entire disclosures of the above-identified applications, including the specifications, drawings and claims are incorporated herein by reference in their entirety.

FIELD

The present disclosure relates to a monitoring system that monitors a virtualization system.

BACKGROUND

Conventionally, in a virtualization system virtualized by a hypervisor (HV) or the like, each of a plurality of functions can be realized by a virtual machine (VM) on a single chip. However, since there are no physical barriers between VMs, if the virtualization system is attacked by an attacker, the impact of the attack may be widespread.

In response to this, techniques for stopping a VM when an anomaly is detected in the VM (for example, PTL 1) and techniques for cutting off communication with the VM (for example, PTL 2) have been disclosed.

CITATION LIST

Patent Literature

PTL 1: Japanese Unexamined Patent Application Publication No. 2019-185130
PTL 2: Japanese Patent No. 6079218

SUMMARY

However, the systems disclosed in PTL 1 and PTL 2 can be improved upon.

In view of this, the present disclosure provides a monitoring system capable of improving upon the above related art.

A monitoring system according to an aspect of the present disclosure is a monitoring system that monitors a virtualization system, the monitoring system including: a plurality of monitors each of which has a different authority, monitors the virtualization system, and detects an anomaly; and a determiner that determines a state of the virtualization system based on monitoring results from the plurality of monitors.

A monitoring system according to one aspect of the present disclosure is capable of improving upon the above related art.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A is a diagram showing an example of monitoring results from a plurality of monitors according to Embodiment 1.

FIG. 2B is a diagram showing an example of a response by a responder according to Embodiment 1.

FIG. 7A is a diagram illustrating an example of monitoring results from a plurality of monitors according to Embodiment 2.

FIG. 7B is a diagram showing an example of a response according to the state of the virtualization system according to Embodiment 2.

FIG. 10 is a diagram showing an example of a determination by a determiner and a response by a responder according to another embodiment.

DESCRIPTION OF EMBODIMENTS

With the technologies disclosed in PTL 1 and PTL 2 described above, when an anomaly of a VM is detected, attention is paid only to the anomaly of the VM, and the state of the entire virtualization system is not determined. In this case, there is a possibility that the functions of the entire virtualization system and thus, the functions of devices (for example, vehicles and the like) equipped with the virtualization system will be hindered.

Thus, a monitoring system that can determine the state of the entire virtualization system will be described below.

Embodiment 1

Hereinafter, the monitoring system according to Embodiment 1 will be described with reference to the drawings.

Figure 1:
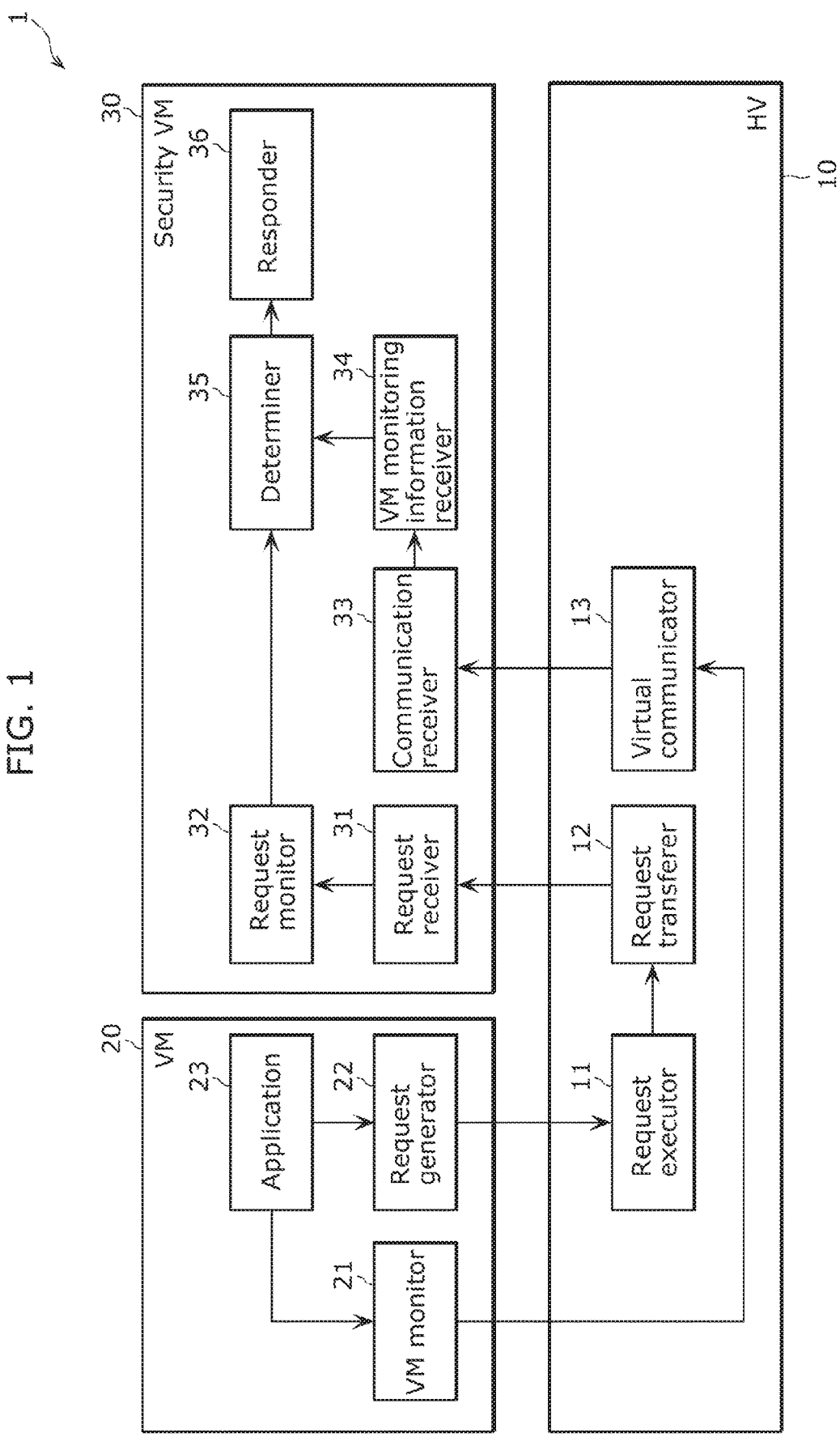
FIG. 1 is a configuration diagram showing an example of a monitoring system according to Embodiment 1.

FIG. 1 is a configuration diagram showing an example of monitoring system 1 according to Embodiment 1.

Monitoring system 1 is a system that monitors a virtualization system, and includes HV 10, VM 20, and security VM 30. A virtual system is a system that has been virtualized and includes a plurality of virtual environments managed by a virtualization infrastructure. Here, HV 10 is shown as the virtualization infrastructure, and VM 20 and security VM 30 are shown as the plurality of virtual environments. It should be noted that the virtualization system includes, for example, a plurality of VMs 20, but here, one VM 20 out of the plurality of VMs 20 will be focused and described. For example, when the virtualization system is installed in a vehicle, VM 20 can be operated as an electronic control unit (ECU).

Monitoring system 1 includes a processor, a memory, and the like. The memory is a read only memory (ROM), a random access memory (RAM), or the like, and can store programs executed by the processor. HV 10, VM 20, and security VM 30 are realized by a processor or the like that executes the programs stored in the memory.

HV 10 is a functional component for realizing the VM, and manages VM 20 and security VM 30. HV 10 is also called a virtualization monitor or a virtualization OS. HV 10 includes request executor 11, request transferer 12 and virtual communicator 13.

Request executor 11 obtains a request (for example, a communication request or a hypercall) from VM 20 and executes the request. The communication request includes information for specifying the communication partner, and the like. The hypercall includes information indicating the content of the process to be caused to be executed by HV 10, and the like.

Request transferer 12 transfers the obtained request from VM 20 to security VM 30.

Virtual communicator 13 communicates with VM 20, security VM 30, and the like. Virtual communicator 13, for example, transfers the monitoring result of VM monitor 21 (to be described later) to security VM 30.

VM 20 is a VM managed by HV 10. The operation of the computer can be reproduced by VM 20, and a plurality of independent functions can be realized on one computer by managing a plurality of VMs 20 by HV 10. For example, one computer can operate a plurality of ECUs. VM 20 includes VM monitor 21, request generator 22, and application 23.

VM monitor 21 monitors VM 20 in the virtualization system. Specifically, VM monitor 21 monitors the operation of application 23 in VM 20, more specifically, access control violations, system call anomalies, and the like. VM monitor 21 notifies HV 10 of the monitoring result. VM monitor 21 is an example of a virtual environment monitor that monitors a virtual environment in a virtualization system, and is one of a plurality of monitors each of which has a different authority, monitors the virtualization system, and detects an anomaly.

Request generator 22 generates a request to HV 10 according to the operation of application 23. For example, when application 23 communicates with another VM 20 or an external device, request generator 22 generates a request for communication with the other VM 20 or communication with an external device. For example, when application 23 causes HV 10 to execute a predetermined process, request generator 22 generates a hypercall including the content of the predetermined process. Request generator 22 notifies HV 10 of the generated request.

Application 23 executes an application program realized by VM 20. For example, when VM 20 operates as an ECU, application 23 executes an application program according to the ECU. It should be noted that one VM 20 may include a plurality of applications 23. That is, a plurality of application programs may be executed in one VM 20.

Security VM 30 is a VM that performs security-related processing for the virtualization system. For example, security VM is accessible to VM 20, but is inaccessible from VM 20, making it less susceptible to attacks than VM 20. For this reason, security-related functions are implemented in security VM 30. Security VM 30 includes request receiver 31, request monitor 32, communication receiver 33, VM monitoring information receiver 34, determiner 35 and responder 36.

Request receiver 31 receives requests from VM 20 to HV 10 that have been transferred from HV 10.

Request monitor 32 monitors requests from VM 20 to HV 10 in the virtualization system. Specifically, request monitor 32 monitors the content of requests to HV 10 or the frequency of requests to HV (that is, the frequency with which request receiver 31 receives requests to HV 10). Request monitor 32 notifies determiner 35 of the monitoring result. Request monitor 32 is an example of a request monitor that monitors requests from the virtual environment to the virtualization infrastructure in the virtualization system, and is one of a plurality of monitors each of which has a different authority, monitors the virtualization system, and detects an anomaly. As mentioned above, security VM 30 is accessible to VM 20 but inaccessible from VM 20, and security VM 30 and VM 20 have different authorities. For this reason, request monitor 32 included in security VM 30 and VM monitor 21 included in VM 20 have different authorities, respectively.

Communication receiver 33 receives information transferred from HV 10. Communication receiver 33 notifies VM monitoring information receiver 34 of the monitoring result of VM monitor 21 among the information transferred from HV 10.

VM monitoring information receiver 34 receives the monitoring result of VM monitor 21. VM monitoring information receiver 34 notifies determiner 35 of the monitoring result of VM monitor 21.

Determiner 35 determines the state of the virtualization system based on the monitoring results from the plurality of monitors. In Embodiment 1, determiner 35 determines the state of the virtualization system based on the monitoring result of VM monitor 21 and the monitoring result of request monitor 32 as the monitoring results from the plurality of monitors. For example, determiner 35 determines the state of the virtualization system according to a combination of monitoring results from a plurality of monitors. Determiner 35 outputs the determined state of the virtualization system. For example, determiner 35 notifies responder 36 of the determined state of the virtualization system. It should be noted that determiner 35 may output the determined state of the virtualization system to a computer, mobile terminal, or the like owned by the user who uses the device in which the virtualization system is installed, or to a server or the like.

Responder 36 makes a response according to the determined state of the virtualization system. The details of a response will be described later.

Next, an example of the monitoring results from the plurality of monitors and the operations of determiner 35 will be described with reference to FIG. 2A.

FIG. 2A is a diagram showing an example of monitoring results from a plurality of monitors according to Embodiment 1. In Embodiment 1, monitoring results from VM monitor 21 and request monitor 32 as a plurality of monitors are shown.

As shown in FIG. 2A, it is assumed that the monitoring result of VM monitor 21 was normal at 13:01:03. In addition, although not shown, it is assumed that the monitoring result of request monitor 32 was also normal. For example, determiner 35 determines that the state of the virtualization system is a normal state according to a combination of the monitoring result of VM monitor 21 being normal and the monitoring result of request monitor 32 being normal.

Next, it is assumed that the monitoring result of request monitor 32 became anomalous at 13:01:10. For example, determiner 35 determines that the state of the virtualization system is a state in which the request from VM 20 is anomalous and VM 20 may be anomalous according to a combination of the monitoring result of VM monitor 21 being normal and the monitoring result of request monitor 32 being anomalous.

Next, it is assumed that the monitoring result of VM monitor 21 became anomalous at 13:01:13. For example, determiner 35 determines that the state of the virtualization system is a state in which VM 20 is anomalous according to a combination of the monitoring result of VM monitor 21 being anomalous and the monitoring result of request monitor 32 being anomalous.

Next, it is assumed that the monitoring result of request monitor 32 remains anomalous even at 13:01:15. For example, determiner 35 determines that the state of the virtualization system is a state in which VM 20 is in an anomalous state according to a combination of the monitoring result of VM monitor 21 being anomalous and the monitoring result of request monitor 32 being anomalous.

Next, the operations of responder 36 will be described with reference to FIG. 2B.

FIG. 2B is a diagram showing an example of the response by responder 36 in Embodiment 1.

For example, when it is determined that the state of the virtualization system is a normal state according to a combination of the monitoring result of VM monitor 21 being normal and the monitoring result of request monitor 32 being normal, responder 36 makes no special response.

For example, when it is determined that the state of the virtualization system is a state in which VM 20 is anomalous and the request from VM 20 may be anomalous according to a combination of the monitoring result of VM monitor 21 being anomalous and the monitoring result of request monitor 32 being normal, responder 36 stops VM 20 or enhances the monitoring of request monitor 32 (specifically, shortens the cycle of the monitoring by request monitor 32, or adjusts the threshold when request monitor 32 detects an anomaly).

For example, when it is determined that the state of the virtualization system is a state in which the request from VM 20 (for example, the request of the inter-VM communication) is anomalous and VM 20 may be anomalous according to a combination of the monitoring result of VM monitor 21 being normal and the monitoring result of request monitor 32 being anomalous, responder 36 cuts off the inter-VM communication or enhances the monitoring by VM monitor 21 (specifically, shortens the cycle of the monitoring by request monitor 21, or adjusts the threshold when request monitor 21 detects an anomaly).

For example, when it is determined that the state of the virtualization system is a state in which VM 20 is anomalous according to a combination of the monitoring result of VM monitor 21 being anomalous and the monitoring result of request monitor 32 being anomalous, responder 36 reboots VM 20.

It should be noted that determiner 35 may determine the state of the virtualization system according to a combination of detailed information on anomaly detected by a plurality of monitors, as a combination of monitoring results from a plurality of monitors. The detailed information of the anomaly may be, for example, the application, VM 20, communication channel, or memory address in which the anomaly occurred, may be the type of anomaly (for example, access control violation, communication frequency anomaly, or the like), or may be numerical information such as the degree of anomaly calculated by machine learning or the like. For example, the determination result of the state of the virtualization system may be different between a combination of the monitoring result of VM monitor 21 being normal and the monitoring result of request monitor 32 being anomalous in the inter-VM communication, and a combination of the monitoring result of VM monitor 21 being normal and the monitoring result of request monitor 32 being anomalous in the hypercall.

Next, the operations of monitoring system 1 will be described with a specific example.

First, the operations of monitoring system 1 when VM monitor 21 detects an anomaly in VM 20 will be described with reference to FIG. 3.

Figure 3:
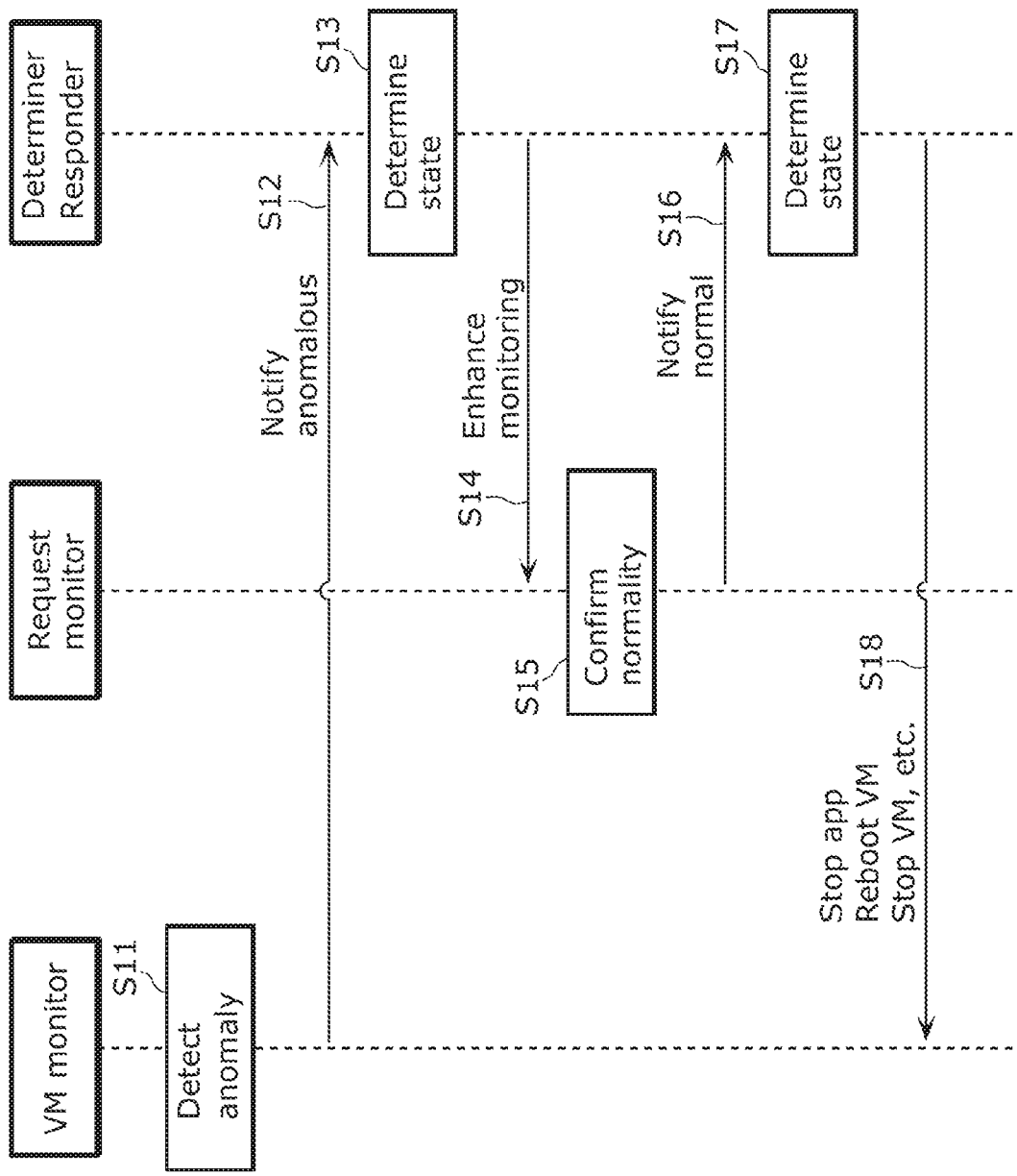
FIG. 3 is a sequence diagram showing an example of the operations of the monitoring system when the VM monitor detects a VM anomaly, according to Embodiment 1.

FIG. 3 is a sequence diagram showing an example of the operations of monitoring system 1 when VM monitor 21 detects an anomaly in VM 20, according to Embodiment 1.

VM monitor 21 monitors VM 20 to detect an anomaly in VM 20 (step S11), and notifies determiner 35 of the monitoring result indicating the anomaly (step S12). It should be noted that although not shown, it is assumed that determiner 35 has obtained a monitoring result indicating normality from request monitor 32.

Determiner 35 determines the state of the virtualization system (step S13). For example, it is determined that the state of the virtualization system is a state in which VM 20 is anomalous and the request from VM 20 may be anomalous, according to a combination of the monitoring result of VM monitor 21 being anomalous and the monitoring result of request monitor 32 being normal.

Responder 36 makes a response according to the determined state of the virtualization system (step S14). For example, responder 36 enhances the monitoring of request monitor 32 as a response to a state in which the request from VM 20 may be anomalous. At this time, request monitor 32 is notified of an ID for identifying VM 20 in which the anomaly has been detected, and the like. This is to make request monitor 32 enhance the monitoring of the request from VM 20 in which an anomaly has been detected.

Request monitor 32 monitors the request from VM 20 to confirm that it is normal (step S15), and notifies determiner 35 of the monitoring result indicating normality (step S16).

Determiner 35 determines the state of the virtualization system (step S17). For example, it is determined that the state of the virtualization system is a state in which VM 20 is anomalous and the request from VM 20 is normal, according to a combination of the monitoring result of VM monitor 21 being anomalous and the monitoring result of request monitor 32 after enhancing the monitoring being normal. It should be noted that determiner 35 may determine the state of the virtualization system as numerical information such as the degree of anomaly by machine learning or the like based on the monitoring results from VM monitor 21 and request monitor 32.

Responder 36 makes a response according to the determined state of the virtualization system (step S18). For example, responder 36 determines whether anomalous application 23 in VM 20 can be identified as a response to the state in which VM 20 is anomalous, and when anomalous application 23 can be identified, responder 36 stops anomalous application 23. When anomalous application 23 cannot be specified, responder 36 reboots VM 20. When the monitoring result of VM monitor 21 returns to normal after anomalous application 23 is stopped or after VM 20 is rebooted, responder 36 finishes enhancing the monitoring of the request from VM 20 that has returned to normal. On the other hand, when the monitoring result of VM monitor 21 remains anomalous, responder 36 stops VM 20. It should be noted that when the state of the virtualization system is determined based on numerical information such as the degree of anomaly, responder 36 may make a response according to the degree of anomaly. For example, responder 36 may stop application 23 when the degree of anomaly is low, and stop VM 20 when the degree of anomaly is high.

Next, the operations of the monitoring system when request monitor 32 detects an anomaly in the inter-VM communication will be described with reference to FIG. 4 and FIG. 5.

Figure 4:
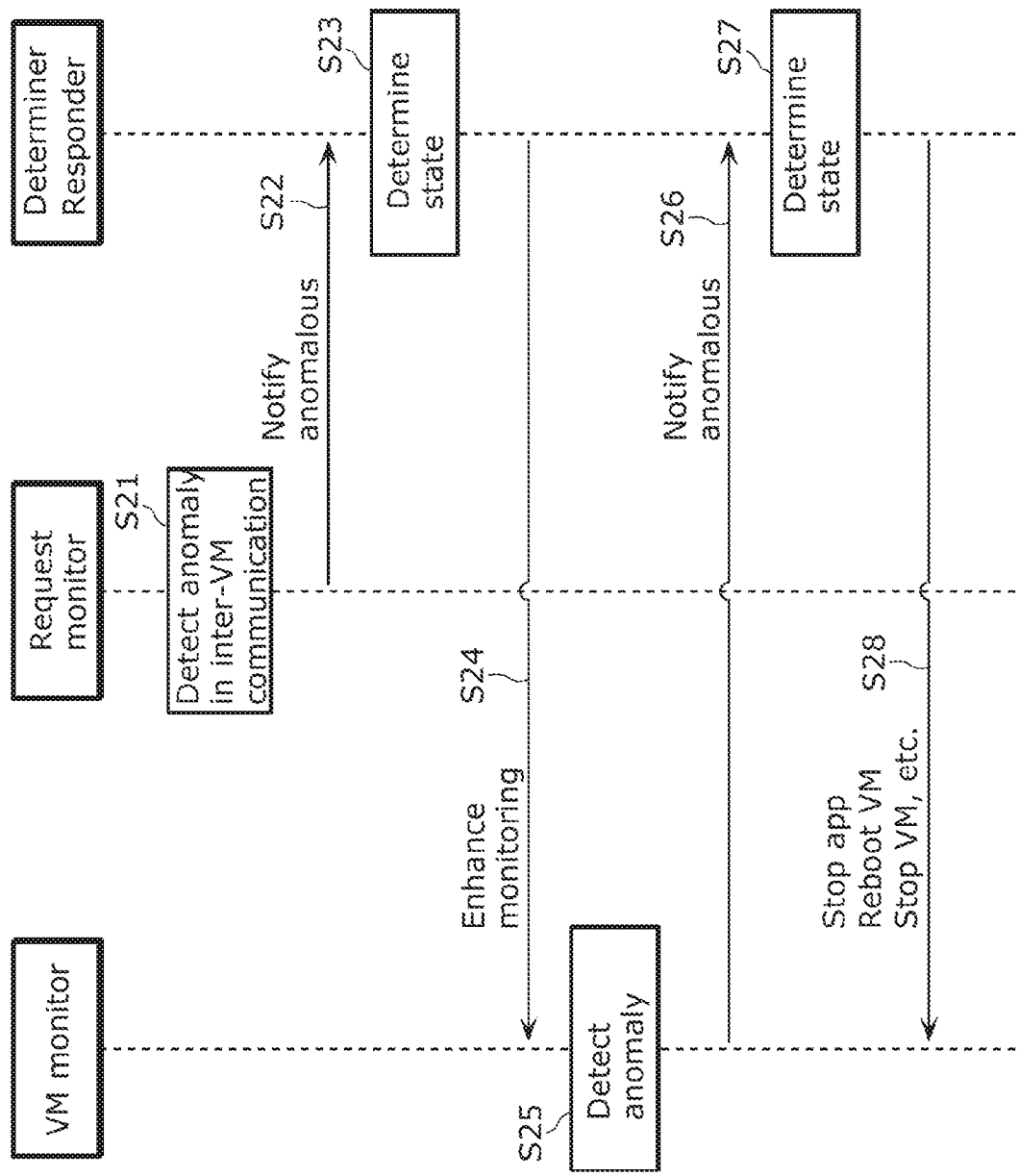
FIG. 4 is a sequence diagram showing an example of the operations of the monitoring system when the request monitor detects an anomaly in the inter-VM communication, according to Embodiment 1.

FIG. 4 is a sequence diagram showing an example of the operations of monitoring system 1 when request monitor 32 detects an anomaly in the inter-VM communication, according to Embodiment 1.

Request monitor 32 monitors the request from VM 20 and detects an anomaly in the inter-VM communication (for example, an anomaly in the destination of the communication of VM 20 being monitored, an anomaly in the frequency of communication requests from VM 20 being monitored, or the like) (step S21), and notifies determiner 35 of a monitoring result indicating an anomaly (step S22). It should be noted that although not shown, it is assumed that determiner 35 has obtained a monitoring result indicating normality from VM monitor 21.

Determiner 35 determines the state of the virtualization system (step S23). For example, the state of the virtualization system is a state in which the inter-VM communication is anomalous and VM 20 may be anomalous, according to a combination of the monitoring result of VM monitor 21 being normal and the monitoring result of request monitor 32 being anomalous in the inter-VM communication.

Responder 36 makes a response according to the determined state of the virtualization system (step S24). For example, responder 36 enhances the monitoring of VM monitor 21 as a response to a state in which VM 20 may be anomalous.

VM monitor 21 monitors VM 20 to confirm that it is anomalous (step S25), and notifies determiner 35 of the monitoring result indicating the anomaly (step S26).

Determiner 35 determines the state of the virtualization system (step S27). For example, it is determined that the state of the virtualization system is a state in which VM 20 is anomalous according to a combination of the monitoring result of VM monitor 21 after enhancing the monitoring being anomalous and the monitoring result of request monitor 32 being anomalous in the inter-VM communication.

Responder 36 makes a response according to the determined state of the virtualization system (step S28). Since the process in step S28 is the same as that in step S18, the description thereof will be omitted.

Figure 5:
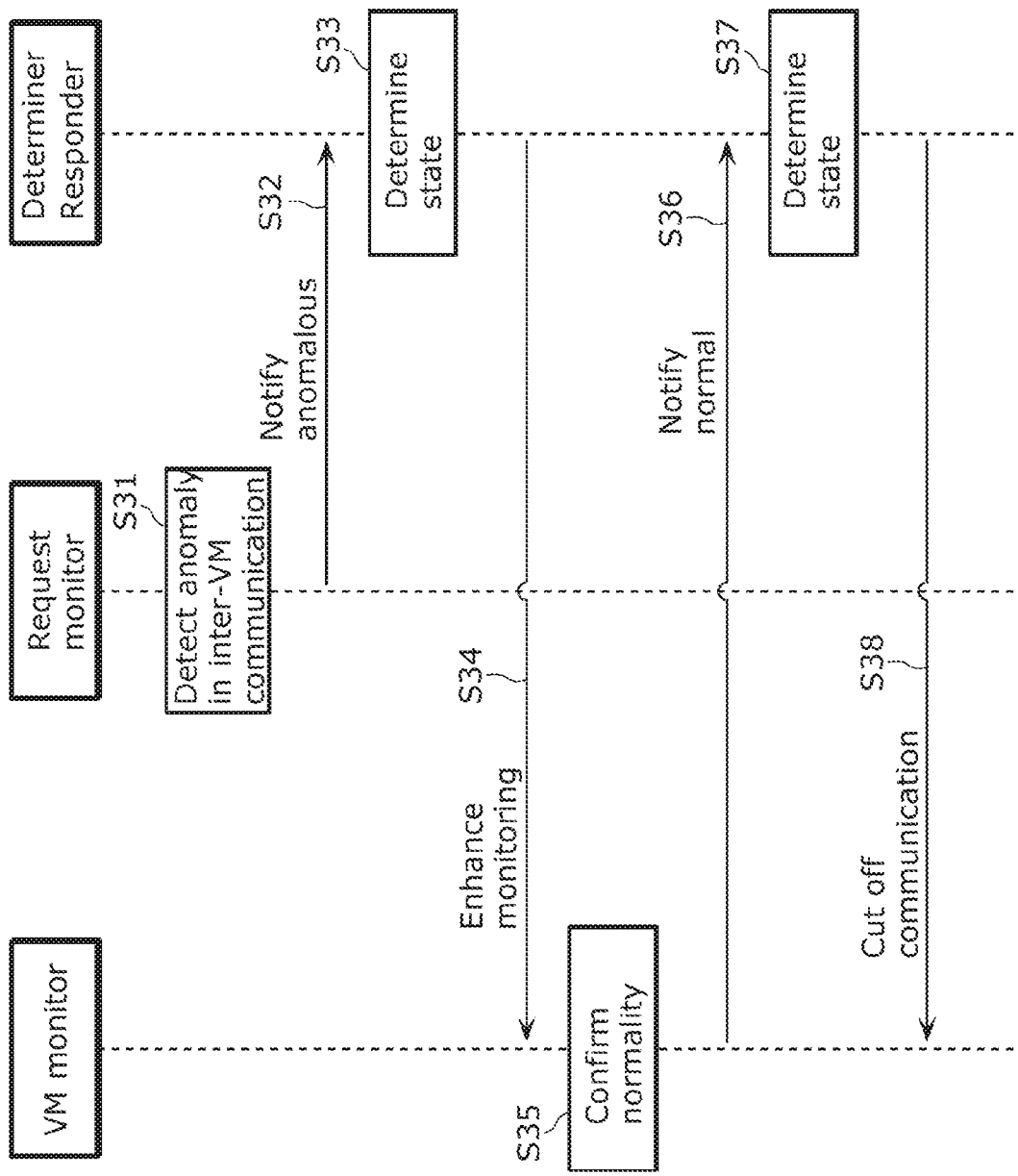
FIG. 5 is a sequence diagram showing another example of the operations of the monitoring system when the request monitor detects an anomaly in the inter-VM communication, according to Embodiment 1.

FIG. 5 is a sequence diagram showing another example of the operations of monitoring system 1 when request monitor 32 detects an anomaly in the inter-VM communication, according to Embodiment 1. Since the processes from step S31 to step S34 in FIG. 5 are the same as the processes from step S21 to step S24 in FIG. 4, the description thereof will be omitted.

VM monitor 21 monitors VM 20 to confirm that it is normal (step S35), and notifies determiner 35 of the monitoring result indicating normality (step S36).

Determiner 35 determines the state of the virtualization system (step S37). For example, it is determined that the state of the virtualization system is a state in which the inter-VM communication is anomalous, according to a combination that the monitoring result of VM monitor 21 after enhancing the monitoring being normal and the monitoring result of request monitor 32 being anomalous in the inter-VM communication.

Responder 36 makes a response according to the determined state of the virtualization system (step S38). For example, responder 36 cuts off the communication channel in which the anomaly is detected as a response to the state in which the inter-VM communication is anomalous. It should be noted that since the monitoring result of VM monitor 21 is normal, there is a possibility that an anomaly in the inter-VM communication is detected erroneously. Thus, when the same anomaly as this time has occurred in the past, responder 36 may cut off the communication channel in which the anomaly was detected. In other words, when the same anomaly as this time has not occurred in the past, responder 36 may not cut off the communication channel in which the anomaly was detected, and when the same anomaly occurs in the future, the communication channel in which the anomaly was detected may be cut off. Alternatively, responder 36 may cut off the communication channel in which the anomaly was detected when the anomaly in the inter-VM communication continues for a certain period of time or longer.

Embodiment 2

Hereinafter, a monitoring system according to Embodiment 2 will be described with reference to the drawings.

Figure 6:
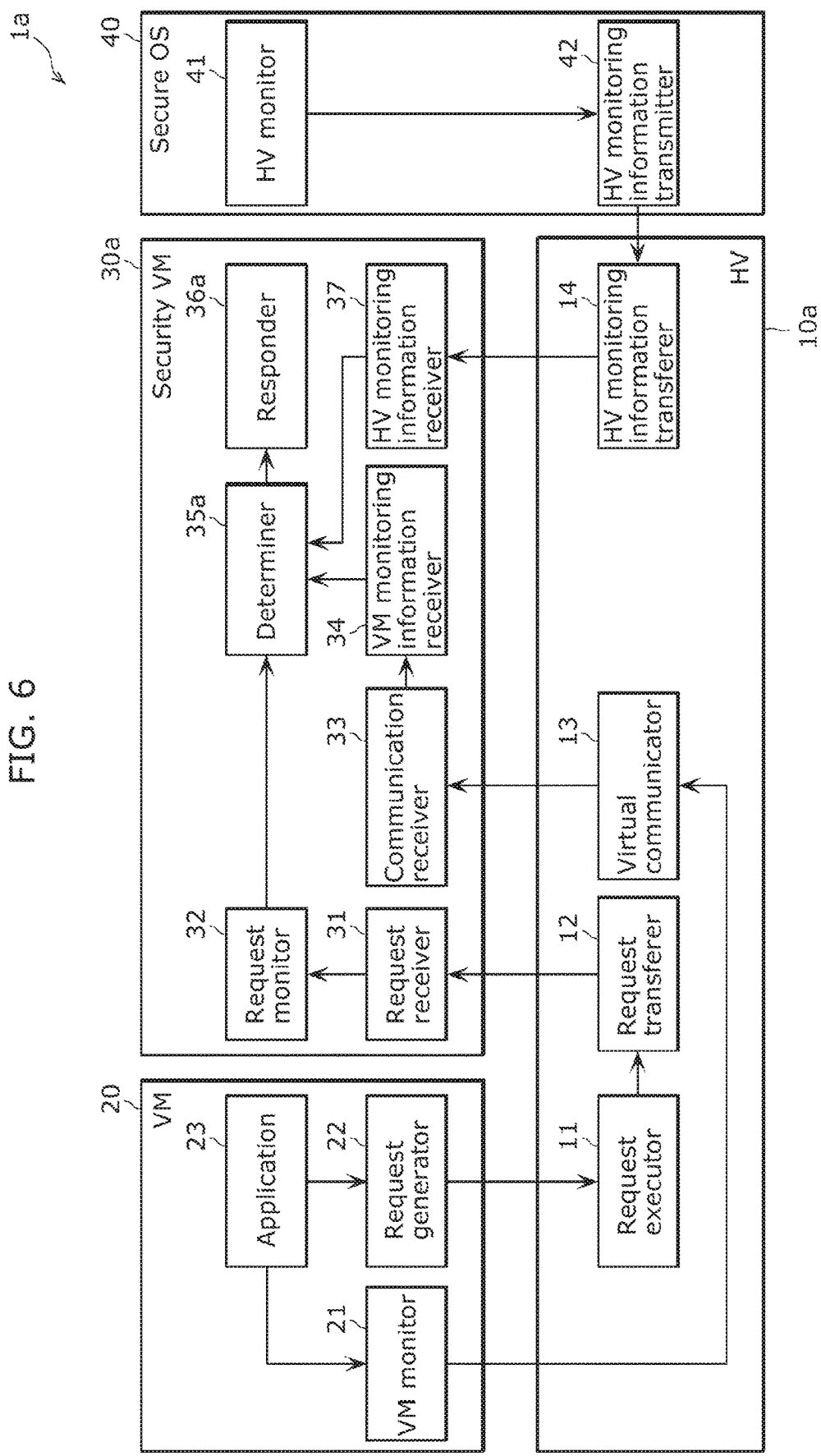
FIG. 6 is a configuration diagram showing an example of a monitoring system according to Embodiment 2.

FIG. 6 is a configuration diagram showing an example of monitoring system 1a according to Embodiment 2.

Monitoring system 1a differs from monitoring system 1 in Embodiment 1 in that it includes HV 10a instead of HV 10 and security VM 30a instead of security VM 30, and further includes secure OS 40. Since other points are the same as those in Embodiment 1, the detailed description thereof will be omitted or simplified.

Monitoring system 1a is a system that monitors the virtualization system, and includes HV 10a, VM 20, security VM 30a, and secure OS 40. The virtualization system is a system that has been virtualized and includes a plurality of virtual environments managed by a virtualization infrastructure. Here, HV 10a is shown as the virtualization infrastructure, and VM 20 and security VM 30a are shown as the plurality of virtual environments.

Monitoring system 1a includes a processor, a memory, and the like. The memory is a ROM, a RAM, or the like, and can store programs executed by the processor. HV 10a, VM 20, security VM and secure OS 40 are realized by a processor or the like that executes programs stored in the memory.

HV 10a is a functional component for realizing a VM, and manages VM 20 and security VM 30a. HV 10a is also called a virtualization monitor or a virtualization OS. HV 10a includes request executor 11, request transferer 12, virtual communicator 13 and HV monitoring information transferer 14. Request executor 11, request transferer 12, and virtual communicator 13 are the same as those in Embodiment 1, so the descriptions thereof will be omitted.

HV monitoring information transferer 14 obtains the monitoring result from HV monitor 41, which will be described later, and transfers it to security VM 30a.

Since VM 20 is the same as in Embodiment 1, the description thereof will be omitted.

Security VM 30a is a VM that performs security-related processing for the virtualization system. For example, security VM is accessible to VM 20, but is inaccessible from VM 20, making it less susceptible to attacks than VM 20. For this reason, security-related functions are implemented in security VM 30*a*. Security VM 30*a* includes request receiver 31, request monitor 32, communication receiver 33, VM monitoring information receiver 34, determiner 35*a*, responder 36*a*, and HV monitoring information receiver 37. Since request receiver 31, request monitor 32, communication receiver 33, and VM monitoring information receiver 34 are the same as those in Embodiment 1, the descriptions thereof will be omitted.

HV monitoring information receiver 37 receives the monitoring result from HV monitor 41. HV monitoring information receiver 37 notifies determiner 35*a* of the monitoring result of HV monitor 41.

Determiner 35*a* determines the state of the virtualization system based on the monitoring results from the plurality of monitors. In Embodiment 2, determiner 35*a* determines the state of the virtualization system based on the monitoring result from VM monitor 21 and the monitoring results from request monitor 32 and HV monitor 41 as the monitoring results from the plurality of monitors. For example, determiner 35*a* determines the state of the virtualization system according to a combination of monitoring results from a plurality of monitors. Determiner 35*a* outputs the determined state of the virtualization system. For example, determiner 35*a* notifies responder 36*a* of the determined state of the virtualization system. It should be noted that determiner 35*a* may output the determined state of the virtualization system to a computer or mobile terminal owned by the user who uses the device in which the virtualization system is installed, or to a server or the like.

Responder 36*a* makes a response according to the determined state of the virtualization system. The details of a response will be described later.

Secure OS 40 is an OS that performs security-related processing for HV 10*a*. For example, secure OS 40 is accessible to the virtualization system, but is inaccessible from the virtualization system, making it less susceptible to attacks than the virtualization system. For this reason, security-related functions of HV 10*a* that realizes the virtualization system are implemented in secure OS 40. Secure OS 40 includes HV monitor 41 and HV monitoring information transmitter 42.

HV monitor 41 monitors HV 10*a* in the virtualization system. Specifically, HV monitor 41 monitors whether the memory of HV 10*a* has been tampered with. HV monitor 41 notifies HV monitoring information transmitter 42 of the monitoring result. HV monitor 41 is an example of a virtualization infrastructure monitor that monitors a virtualization infrastructure in a virtualization system, and is one of a plurality of monitors each of which has a different authority, monitors the virtualization system, and detects an anomaly. As mentioned above, secure OS 40 is accessible to the virtualization system, but is inaccessible from the virtualization system, and secure OS 40 and the virtualization system have different authorities. For this reason, HV monitor 41 included in secure OS 40 and VM monitor 21 and request monitor 32 included in the virtualization system have different authorities.

HV monitoring information transmitter 42 transmits the monitoring result from HV monitor 41 to HV 10*a*.

Next, an example of the monitoring results from the plurality of monitors and the operations of determiner 35*a* will be described with reference to FIG. 7A.

FIG. 7A is a diagram showing an example of monitoring results from a plurality of monitors according to Embodiment 2. In Embodiment 2, monitoring results from VM monitor 21, request monitor 32, and HV monitor 41 are shown as the plurality of monitors.

As shown in FIG. 7A, it is assumed that the monitoring result of VM monitor 21 was normal at 13:01:03. In addition, although not shown, it is assumed that the monitoring results from request monitor 32 and HV monitor 41 are also normal. For example, determiner 35*a* determines that the state of the virtualization system is a normal state according to a combination of the monitoring result of VM monitor 21 being normal, the monitoring result of request monitor 32 being normal, and the monitoring result of HV monitor 41 being normal.

Next, it is assumed that the monitoring result from request monitor 32 becomes anomalous at 13:01:10. For example, determiner 35*a* determines that the state of the virtualization system is a state in which the request from VM 20 is anomalous, VM 20 may be anomalous, and HV 10*a* may be anomalous, according to a combination of the monitoring result of VM monitor 21 being normal, the monitoring result of request monitor 32 being anomalous, and the monitoring result of HV monitor 41 being normal.

Next, it is assumed that the monitoring result of VM monitor 21 becomes anomalous at 13:01:13. For example, determiner 35*a* determines that the state of the virtualization system is a state in which VM 20 is anomalous, according to a combination of the monitoring result of VM monitor 21 being anomalous, the monitoring result of request monitor 32 being anomalous, and the monitoring result of HV monitor 41 being normal.

Next, it is assumed that the monitoring result of request monitor 32 remains anomalous even at 13:01:15. For example, determiner 35*a* determines that the state of the virtualization system is a state in which VM 20 is anomalous, according to a combination of the monitoring result of VM monitor 21 being anomalous, the monitoring result of request monitor 32 being anomalous, and the monitoring result of HV monitor 41 being normal.

Next, it is assumed that the monitoring result of HV monitor 41 remains normal even at 13:01:20. For example, determiner 35*a* determines that the state of the virtualization system is a state in which VM 20 is anomalous, according to a combination of the monitoring result of VM monitor 21 being anomalous, the monitoring result of request monitor 32 being anomalous, and the monitoring result of HV monitor 41 being normal.

Next, the operations of responder 36*a* will be described with reference to FIG. 7B.

FIG. 7B is a diagram showing an example of a response of responder 36*a* in Embodiment 2.

For example, when it is determined that the state of the virtualization system is a normal state according to a combination of the monitoring result of VM monitor 21 being normal, the monitoring result of request monitor 32 being normal, and the monitoring result of HV monitor 41 being normal, responder 36*a* makes no special response.

For example, when it is determined that the state of the virtualization system is a state in which VM 20 is anomalous and the request from VM 20 may be anomalous according to a combination of the monitoring result of VM monitor 21 being anomalous, the monitoring result of request monitor 32 being normal, and the monitoring result of HV monitor 41 being normal, responder 36 stops VM 20 or enhances the monitoring of request monitor 32. In addition, when it is determined that the state of the virtualization system is a state in which HV 10*a* may be anomalous, responder 36*a* may enhance the monitoring of HV monitor 41 (specifically, may shorten the cycle of the monitoring by HV monitor 41, or adjust the threshold when HV monitor 41 detects an anomaly).

For example, when it is determined that the state of the virtualization system is a state in which the request from VM 20 (for example, the request of the inter-VM communication) is anomalous and VM 20 may be anomalous according to a combination of the monitoring result of VM monitor 21 being normal, the monitoring result of request monitor 32 being anomalous, and the monitoring result of HV monitor 41 being normal, responder 36 cuts off the inter-VM communication or enhances the monitoring of VM monitor 21. In addition, when it is determined that the state of the virtualization system is a state in which HV 10a may be anomalous, responder 36a may enhance the monitoring of HV monitor 41.

For example, when it is determined that the state of the virtualization system is a state in which HV 10a is anomalous according to a combination of the monitoring result of VM monitor 21 being normal, the monitoring result of request monitor 32 being normal, and the monitoring result of HV monitor 41 being anomalous, responder 36 reboots the virtualization system (that is, reboots HV 10a).

For example, when it is determined that the state of the virtualization system is a state in which VM 20 is anomalous according to a combination of the monitoring result of VM monitor 21 being anomalous, the monitoring result of request monitor 32 being anomalous, and the monitoring result of HV monitor 41 being normal, responder 36 reboots VM 20.

It should be noted that determiner 35a may determine the state of the virtualization system according to a combination of detailed information on anomaly detected by a plurality of monitors, as a combination of monitoring results from a plurality of monitors. The detailed information of the anomaly may be, for example, the application, VM 20, communication channel, or memory address in which the anomaly occurred, may be the type of anomaly (for example, access control violation, communication frequency anomaly, or the like), or may be numerical information such as the degree of anomaly calculated by machine learning or the like.

Next, the operations of monitoring system 1a when request monitor 32 detects a hypercall anomaly will be described with reference to FIG. 8 and FIG. 9.

Figure 8:
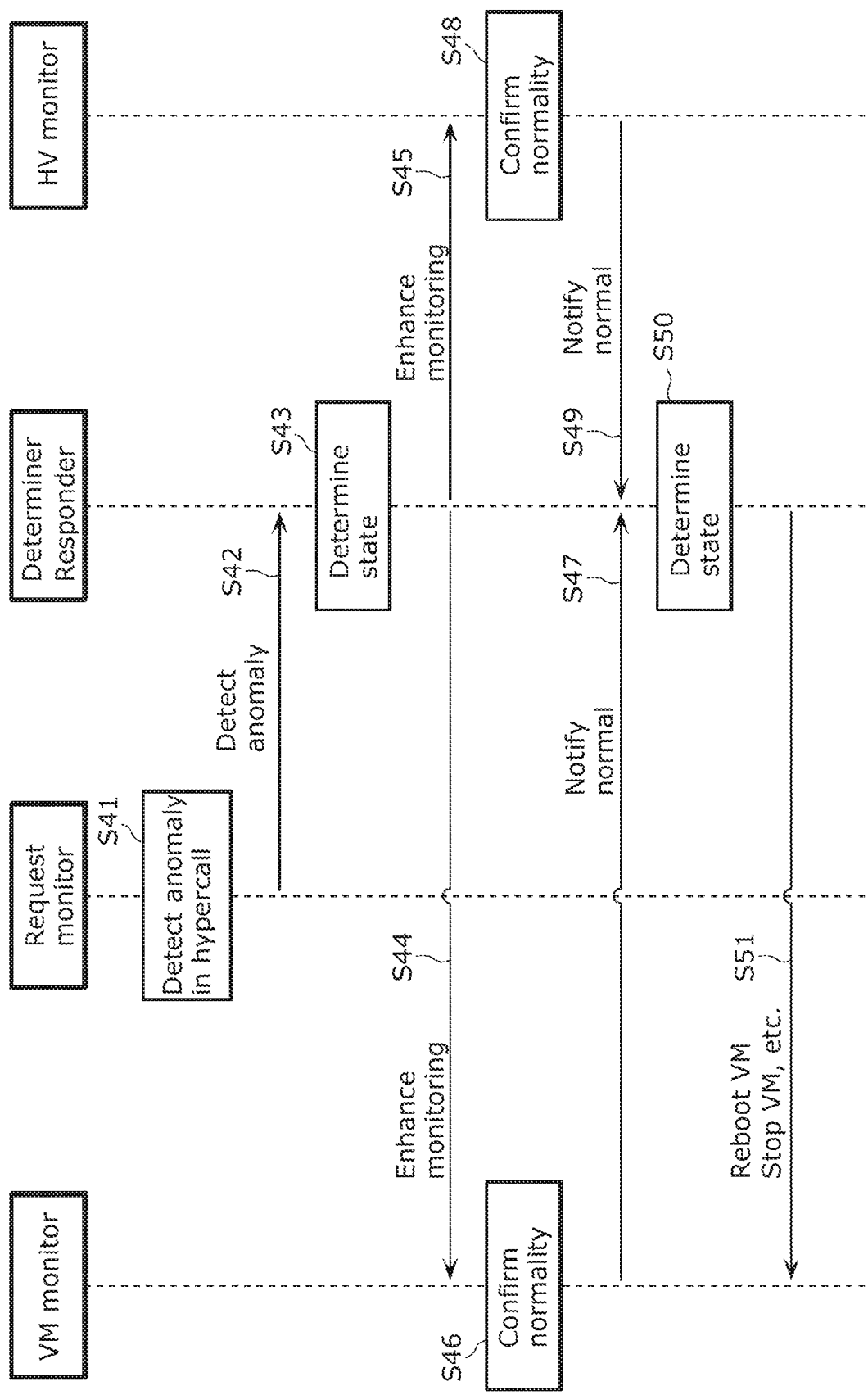
FIG. 8 is a sequence diagram showing an example of the operations of the monitoring system when the request monitor detects an hypercall anomaly, according to Embodiment 2.

FIG. 8 is a sequence diagram showing an example of the operations of monitoring system 1a when request monitor 32 detects a hypercall anomaly, according to Embodiment 2.

Request monitor 32 monitors the request from VM 20 to detect an anomaly in the hypercall (step S41), and notifies determiner 35a of the monitoring result indicating the anomaly (step S42). It should be noted that although not shown, it is assumed that determiner 35a has obtained monitoring results indicating normality from VM monitor 21 and HV monitor 41.

Determiner 35a determines the state of the virtualization system (step S43). For example, it is determined that the state of the virtualization system is a state in which the hypercall is anomalous, VM 20 may be anomalous, and HV 10a may be anomalous, according to a combination of the monitoring result of VM monitor 21 being normal, the monitoring result of request monitor 32 being anomalous in the hypercall, and the monitoring result of HV monitor 41 being normal. It should be noted that determiner 35a may determine the state of the virtualization system as numerical information such as the degree of anomaly by machine learning or the like, based on the monitoring results from VM monitor 21 and request monitor 32.

Responder 36a makes a response according to the determined state of the virtualization system (steps S44 and S45). For example, responder 36a enhances the monitoring of VM monitor 21 as a response to a state in which VM 20 may be anomalous, and enhances the monitoring of HV monitor 41 as a response to a state in which HV 10a may be anomalous. It should be noted that when the state of the virtualization system is determined based on numerical information such as the degree of anomaly, responder 36a may make a response according to the degree of anomaly. For example, responder 36a may enhance the monitoring of VM monitor 21 when the degree of anomaly is low, and may enhance the monitoring of HV monitor 41 when the degree of anomaly is high.

VM monitor 21 monitors VM 20 to confirm that it is normal (step S46), and notifies determiner 35a of the monitoring result indicating normality (step S47).

HV monitor 41 monitors HV 10a to confirm that it is normal (step S48), and notifies determiner 35a of the monitoring result indicating normality (step S49).

Determiner 35a determines the state of the virtualization system (step S50). For example, it is determined that the state of the virtualization system is a state in which the hypercall is anomalous according to a combination of the monitoring result of VM monitor 21 after enhancing the monitoring being normal, the monitoring result of request monitor 32 being anomalous in the hypercall, and the monitoring result of HV monitor 41 being normal after enhancing the monitoring.

Responder 36a makes a response according to the determined state of the virtualization system (step S51). For example, responder 36a reboots or stops VM 20 that requested the hypercall as a response to the state in which the hypercall is anomalous. It should be noted that since the monitoring result of VM monitor 21 is normal, there is a possibility that an anomaly in the hypercall is detected erroneously. Thus, when the same anomaly as this time has occurred in the past, responder 36a may reboot or stop VM 20 that requested the hypercall. In other words, when the same anomaly as this time has not occurred in the past, responder 36 may not reboot or stop VM 20 that requested the hypercall, and when the same anomaly occurs in the future, VM 20 that requested the hypercall may be rebooted or stopped. Alternatively, responder 36a may reboot or stop VM 20 that requested the hypercall when the anomaly in the hypercall continues for a certain period of time or longer.

Figure 9:
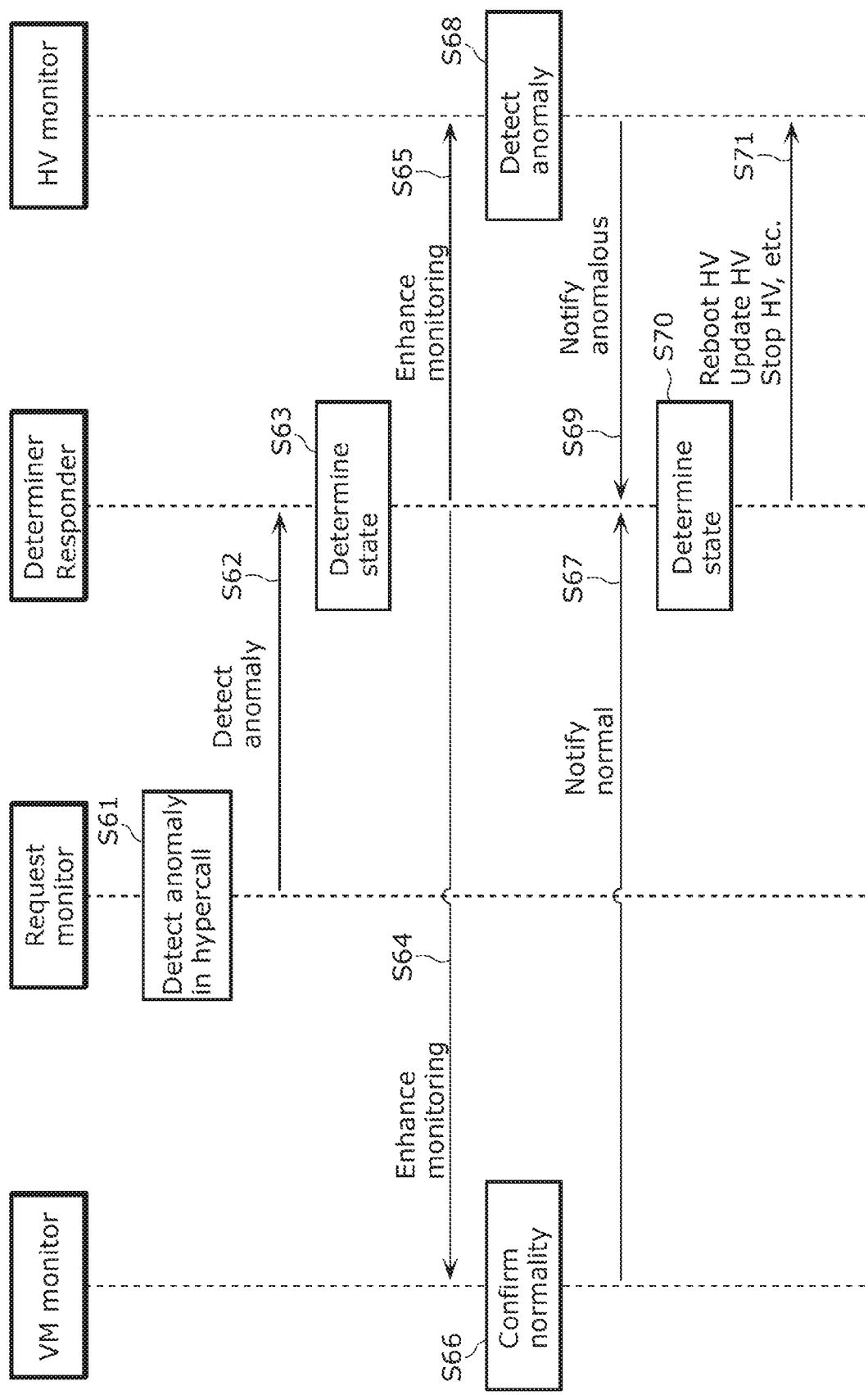
FIG. 9 is a sequence diagram showing another example of the operations of the monitoring system when the request monitor detects a hypercall anomaly, according to Embodiment 2.

FIG. 9 is a sequence diagram showing another example of the operations of monitoring system 1a when request monitor 32 detects an anomaly in the hypercall, according to Embodiment 2. Since the processes from step S61 to step S67 in FIG. 9 are the same as the processes from step S41 to step S47 in FIG. 8, the description thereof will be omitted.

HV monitor 41 monitors HV 10a to confirm that it is anomalous (step S68), and notifies determiner 35a of the monitoring result indicating the anomaly (step S69).

Determiner 35a determines the state of the virtualization system (step S70). For example, it is determined that the state of the virtualization system is a state in which HV 10a is anomalous according to a combination of the monitoring result of VM monitor 21 after enhancing the monitoring being normal, the monitoring result of request monitor 32 being anomalous in the hypercall, and the monitoring result of HV monitor 41 being anomalous after enhancing the monitoring.

Responder 36a makes a response according to the determined state of the virtualization system (step S71). For example, responder 36a reboots, updates, or stops HV 10a as a response to the state in which HV 10a is anomalous. For example, responder 36a reboots HV 10a, and when the monitoring results from request monitor 32 and HV monitor 41 return to normal after HV 10a has been rebooted, responder 36a finishes enhancing the monitoring by each monitor. When the monitoring results from request monitor 32 and HV monitor 41 remain anomalous after rebooting HV 10a, responder 36a updates the memory of HV 10a. For example, when the monitoring results from request monitor 32 and HV monitor 41 return to normal after updating the memory of HV 10a, responder 36a finishes enhancing the monitoring by each monitor. When the monitoring results from request monitor 32 and HV monitor 41 remain anomalous after updating the memory of HV 10a, responder 36a stops HV 10a.

SUMMARY

The monitoring system is a system that monitors a virtualization system (a system consisting of HV, VM, etc.), the monitoring system including: a plurality of monitors each of which has a different authority, monitors the virtualization system, and detects an anomaly; and a determiner that determines a state of the virtualization system based on monitoring results from the plurality of monitors.

According to this, since the entire virtualization system is monitored by a plurality of monitors instead of a single monitor, the state of the entire virtualization system can be determined based on the monitoring results from the plurality of monitors. In addition, since a plurality of monitors each of which has a different authority are used, it is possible to improve the detection accuracy of anomaly, and to suppress erroneous detection or omission of detection.

For example, the plurality of monitors may include at least one of a VM monitor that monitors a VM in the virtualization system, a request monitor that monitors a request from the VM to a HV in the virtualization system, or an HV monitor that monitors the HV in the virtualization system.

According to this, the state of the entire virtualization system can be determined in detail based on the monitoring result of the VM, the monitoring result of the request from the VM to the HV, or the monitoring result of the HV.

For example, the determiner may determine the state of the virtualization system according to a combination of monitoring results from a plurality of monitors.

According to this, the state of the virtualization system can be predicted to some extent by a combination of the monitoring results from a plurality of monitors. For this reason, the state of the virtualization system can be accurately determined by a combination of the monitoring results from the plurality of monitors.

For example, the monitoring system may further include a responder that responds according to the state of the virtualization system that has been determined.

According to this, it is possible to make a response according to the state of the entire virtualization system, for example, it is possible to make a response in which the effects on the functions of devices (such as vehicles or the like) equipped with the virtualization system are suppressed.

OTHER EMBODIMENTS

As described above, the embodiments have been described as examples of the technology according to the present disclosure. However, the technology according to the present disclosure is not limited thereto, and can also be applied to embodiments in which changes, replacements, additions, omissions, or the like are made as appropriate. For example, the following variations are also included in one embodiment of the present disclosure.

For example, in the above embodiment, an example in which the virtualization system is an HV type system has been described, but it may be a container or host OS type system.

For example, in the above embodiment, an example in which an anomaly in the inter-VM communication is detected by monitoring the request from the VM to the HV is described, but the present invention is not limited thereto. For example, the virtualization system may include a gateway VM that mediates the inter-VM communication, and the content of communication in the inter-VM communication may be monitored in the gateway VM to detect an anomaly in the inter-VM communication according to the content of communication.

For example, in the above embodiment, an example in which the determiner determines the state of the virtualization system according to a combination of monitoring results from a plurality of monitors, but the present invention is not limited thereto.

For example, the determiner may determine the state of the virtualization system according to the detection order of anomaly detected by a plurality of monitors. For example, when the monitoring results from the VM monitor and the request monitor had been normal, between the case where the monitoring result of the VM monitor became anomalous, and then the monitoring result of the request monitor became anomalous, and the case where the monitoring result of the monitor became anomalous and then the monitoring result of the VM monitor became anomalous, the determination result of the state of the virtualization system may be different. Here, a specific example of determining the state of the virtualization system according to the detection order of anomaly detected by a plurality of monitors and making a response thereto will be described with reference to FIG. 10.

FIG. 10 is a diagram showing an example of determination by the determiner and a response by the responder according to another embodiment. For example, in a monitoring system that includes a VM monitor, a request monitor, and an HV monitor as a plurality of monitors, the determination of the state of the virtualization system according to the detection order of anomaly detected by a plurality of monitors and the response thereto will be described. It should be noted that the monitoring system described here includes not only a VM with a VM monitor, but also a VM without a VM monitor. Hereinafter, a VM with a VM monitor is called VM_A, and a VM without a VM monitor is called VM_B.

For example, when the monitoring result of the VM monitor became anomalous, and then the monitoring result of the request monitor became anomalous, the determiner determines that the state of the virtualization system is a state in which after an anomaly has occurred in VM_A, there is a possibility that the anomaly is being deployed outside of VM_A, and the responder reboots VM_A according to the state. For example, when the monitoring result of the request monitor became anomalous, and then the monitoring result of the VM monitor became anomalous, the determiner determines that the state of the virtualization system is a state in which after an anomaly occurred in VM_B, there is a possibility that the anomaly has been deployed to VM_A, and the responder reboots VM_A and VM_B according to the state. For example, when the monitoring result of the VM monitor became anomalous, then the monitoring result of the request monitor became anomalous, and then the monitoring result of the HV monitor became anomalous, the determiner determines that the state of the virtualization system is a state in which after an anomaly occurred in VM_A, there is a possibility that the anomaly has been deployed to the HV, and the responder reboots the HV according to the state, and enhances the monitoring of the VM monitor. For example, when the monitoring result of the request monitor became anomalous, then the monitoring result of the HV monitor became anomalous, and then the monitoring result of the VM monitor became anomalous, the determiner determines that the state of the virtualization system is a state in which after an anomaly occurred in VM_B, there is a possibility that the anomaly has been deployed to HV and VM_A.

As such, since the state of the virtualization system can be predicted to some extent based on the detection order of the anomaly detected by a plurality of monitors, the state of the virtualization system can be accurately determined by the detection order of the anomalies detected by the plurality of monitors.

For example, the determiner may determine the state of the virtualization system according to the duration of anomaly detected by a plurality of monitors. For example, when the monitoring results from the VM monitor and the request monitor had been normal, but the monitoring result of the VM monitor became anomalous, and the monitoring result of the VM monitor became normal before the specified time elapsed, since there is a possibility that the anomalous monitoring result from the VM monitor is an erroneous detection, the determiner may determine that the state of the virtualization system is normal. Since the state of the virtualization system can be predicted to some extent based on the duration of anomaly detected by a plurality of monitors, the state of the virtualization system can be accurately determined based on the duration of anomalies detected by the plurality of monitors.

For example, when determining the state of the virtualization system, the determiner may weight each of the monitoring results from the plurality of monitors according to the authority of each of the plurality of monitors and the like. At that time, the monitoring result of the monitor having higher authority may be preferentially used for the determination. For example, even if the monitoring result of the VM monitor is normal, when the monitoring result of the HV monitor is anomalous, the determination and response with priority given to the monitoring result of the HV monitor may be performed.

It should be noted that the present disclosure can be realized not only as a monitoring system, but also as a monitoring method including steps (processes) performed by each component included in the monitoring system.

For example, the steps in the monitoring method may be executed by a computer (computer system). Additionally, the present disclosure can be realized as a program for causing a computer to execute the steps included in the monitoring method.

Furthermore, the present disclosure can be realized as a non-transitory computer-readable recording medium such as a CD-ROM on which the program is recorded.

For example, when the present disclosure is realized by a program (software), each step is executed by executing the program using hardware resources such as the CPU, a memory, and input/output circuits of the computer. That is, each step is executed by the CPU obtaining data from a memory, an input/output circuit, or the like to perform an operation, or outputting the operation result to the memory, an input/output circuit, or the like.

In addition, each component included in the monitoring system of the above embodiments may be realized as a dedicated or general-purpose circuit.

In addition, each component included in the monitoring system of the above embodiments may be realized as a large scale integration (LSI), which is an integrated circuit (IC).

In addition, the integrated circuit is not limited to LSI, and may be realized by a dedicated circuit or a general-purpose processor. A programmable field programmable gate array (FPGA) or a reconfigurable processor capable of reconfiguring connections and settings of circuit cells inside the LSI may be used.

Furthermore, if an integrated circuit technology that replaces an LSI appears due to advances in semiconductor technology or another technology derived therefrom, it is natural that each component included in the monitoring system may be integrated into a circuit using that technology.

In addition, forms obtained by applying various modifications to embodiments conceived by a person skilled in the art or forms realized by arbitrarily combining the components and functions in each embodiment without departing from the spirit of the present disclosure are also included in this disclosure.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2021-031994 filed on Mar. 1, 2021, and PCT International Application No. PCT/JP2021/042361 filed on Nov. 18, 2021.

INDUSTRIAL APPLICABILITY

The present disclosure can be applied, for example, to a system that monitors a virtualization system installed in a vehicle.

The invention claimed is:

1. A monitoring system that monitors a virtualization system, the monitoring system comprising:
  a processor; and
  at least one memory including programs that, when executed by the processor, cause the processor to perform operations, the operations including:
    monitoring, by a plurality of monitors, the virtualization system, each of the plurality of monitors being implemented by the processor executing one of the programs, each of the plurality of monitors having a different authority;
    detecting, by at least one of the plurality of monitors, an anomaly in the virtualization system; and
    determining a state of the virtualization system based on monitoring results from the plurality of monitors,
  wherein each of the plurality of monitors includes different level of authorities, with a monitoring result of a monitor having a higher authority being given a higher priority for the determining.

2. The monitoring system according to claim 1,
wherein the plurality of monitors include at least one of a virtual environment monitor that monitors a virtual environment in the virtualization system, a request monitor that monitors a request from the virtual environment to a virtualization infrastructure in the virtualization system, or a virtualization infrastructure monitor that monitors the virtualization infrastructure in the virtualization system.

3. The monitoring system according to claim 1,
wherein the processor determines the state of the virtualization system according to a combination of the monitoring results from the plurality of monitors.

4. The monitoring system according to claim 1,
wherein the processor determines the state of the virtualization system according to a detection order of the anomalies detected by the plurality of monitors.

5. The monitoring system according to claim 1,
wherein the processor determines the state of the virtualization system according to a duration of the anomalies detected by the plurality of monitors.

6. The monitoring system according to claim 1, wherein the operations further include:
responding according to the state of the virtualization system that has been determined by the processor.

7. The monitoring system according to claim 1, wherein
the plurality of monitors includes a first monitor and a second monitor, each of which has a different authority, the second monitor is accessible to the first monitor, and the first monitor is inaccessible to the second monitor.

8. The monitoring system according to claim 7, wherein
the first monitor is a virtual environment monitor that monitors a virtual environment in the virtualization system, and
the second monitor is a request monitor that monitors a request from the virtual environment to a virtualization infrastructure in the virtualization system.

9. The monitoring system according to claim 7, wherein
the plurality of monitors further includes a third monitor which has a different authority from the first authority and the second authority,
the third monitor is accessible to the first monitor and the second monitor, and
the first monitor and the second monitor are inaccessible to the third monitor.

10. The monitoring system according to claim 9, wherein
the first monitor is a virtual environment monitor that monitors a virtual environment in the virtualization system,
the second monitor is a request monitor that monitors a request from the virtual environment to a virtualization infrastructure in the virtualization system, and
the third monitor is a virtualization infrastructure monitor that monitors the virtualization infrastructure in the virtualization system.

11. The monitoring system according to claim 9, wherein
the first monitor is provided in a first virtual environment in the virtualization system,
the second monitor is provided in a second virtual environment in the virtualization system,
the third monitor is provided in an operating system (OS) that performs security-related processing for a virtualization infrastructure in the virtualization system,
the second virtual environment is accessible to the first virtual environment,
the first virtual environment is inaccessible to the second virtual environment,
the virtualization system is accessible to the OS, and
the OS is inaccessible to the virtualization system.

12. The monitoring system according to claim 7, wherein
the first monitor is provided in a first virtual environment in the virtualization system,
the second monitor is provided in a second virtual environment in the virtualization system,
the second virtual environment is accessible to the first virtual environment, and
the first virtual environment is inaccessible to the second virtual environment.

13. The monitoring system according to claim 1, wherein
when determining the state of the virtualization system, the processor weights each of the monitoring results from the plurality of monitors according to an authority of each of the plurality of monitors.

14. The monitoring system according to claim 13, wherein
the processor preferentially uses the monitoring result of the monitor having the higher authority in the determining.

15. The monitoring system according to claim 1, wherein
the processor determines that a first monitor of the plurality of monitors is in an anomalous state in response to a combination of a first monitoring result of a second monitor of the plurality of monitors and a second monitoring result of a third monitor of the plurality of monitors being anomalous.

16. The monitoring system according to claim 15, wherein
the first monitor is accessible to the second monitor and the third monitor, and
at least the third monitor is inaccessible to the first monitor.

17. The monitoring system according to claim 1, further comprising:
a secure operating system that performs that performs security-related processing for a virtualization infrastructure of the virtualization system,
wherein the virtualization infrastructure is accessible to the secure operating system, and
the secure operating system is inaccessible to the virtualization system.

18. The monitoring system according to claim 17, wherein
the plurality of monitors includes a first monitor, a second monitor, a third monitor which include the different level of authorities,
the first monitor is a virtual environment monitor that monitors a virtual environment in the virtualization system,
the second monitor is a request monitor that monitors a request from the virtual environment to the virtualization infrastructure in the virtualization system,
the third monitor is a virtualization infrastructure monitor that monitors the virtualization infrastructure in the virtualization system
the secure operating system is inaccessible to the first monitor, the second monitor, and the third monitor,
the first monitor and the second monitor are inaccessible to the secure operating system, and
the third monitor is accessible to the secure operating system.

19. A monitoring system that monitors a virtualization system, the monitoring system comprising:
a processor; and
a memory including programs that, when executed by the processor, cause the processor to perform operations, the operations including:
monitoring, by a plurality of the programs, the virtualization system, each of the plurality of the programs having a different authority;
detecting, by at least one of the plurality of the programs, an anomaly in the virtualization system; and
determining a state of the virtualization system based on monitoring results from the plurality of the programs,
wherein each of the plurality of the programs includes different level of authorities, with a monitoring result of a program having a higher authority being given a higher priority for the determining.

20. A monitoring system that monitors a virtualization system, the monitoring system comprising:
a processor; and
a memory including a program that, when executed by the processor, causes the processor to perform operations, the operations including:
monitoring, as a hypervisor, the virtualization system;
monitoring, as a first virtual machine, the virtualization system;
monitoring, as a second virtual machine, the virtualization system;
detecting, by at least one of the hypervisor, the first virtual machine, or the second virtual machine, an anomaly in the virtualization system; and
determining a state of the virtualization system based on monitoring results from the hypervisor, the first virtual machine, and the second virtual machine,
wherein each of the hypervisor, the first virtual machine, and the second virtual machine has a different authority, and
each of the hypervisor, the first virtual machine, and the second virtual machine has a different level of authority, with a monitoring result of one of the hypervisor, the first virtual machine, and the second virtual machine having a higher authority being given a higher priority for the determining.

* * * * *